United States Patent [19]

Donachiue

[11] 4,265,647
[45] May 5, 1981

[54] AIR PREFILTER

[76] Inventor: James P. Donachiue, 28 Helene St., Apt. 804, Mississauga, Ontario, Canada, L5G 3B7

[21] Appl. No.: 38,543

[22] Filed: May 14, 1979

[30] Foreign Application Priority Data

Apr. 6, 1979 [CA] Canada .................................. 325108

[51] Int. Cl.³ ........................ B01D 50/00; B60J 13/02
[52] U.S. Cl. ........................................ 55/315; 55/328; 55/333; 55/385 B; 55/496; 55/503; 55/507; 55/521
[58] Field of Search ................... 55/321, 323, 328, 330, 55/331, 333, 336, 385 B, 385 F, 482, 487, 486, 501, 503, 507, 509, 510, 521, 522, DIG. 13, 436, DIG. 25, 315

[56] References Cited

U.S. PATENT DOCUMENTS

| | | | |
|---|---|---|---|
| 956,832 | 5/1910 | Seitz ........................................ | 55/487 |
| 1,922,688 | 8/1933 | Kamrath ................................ | 55/330 |
| 3,115,873 | 12/1963 | Hahn et al. .............................. | 55/510 |
| 3,308,610 | 3/1967 | Springer et al. ................ | 55/DIG. 13 |
| 3,319,404 | 5/1967 | Lowther ................................. | 55/510 |
| 3,410,057 | 11/1968 | Lerner ................................ | 55/DIG. 13 |
| 3,458,050 | 7/1969 | Cooper ................................... | 55/510 |
| 3,616,617 | 11/1971 | De Groote .................... | 55/DIG. 25 |
| 3,847,577 | 11/1974 | Hansen ................................ | 55/385 B |
| 4,157,902 | 6/1979 | Tokar ...................................... | 55/331 |
| 4,157,968 | 6/1979 | Kronsbein .............................. | 55/482 |

FOREIGN PATENT DOCUMENTS

| | | | |
|---|---|---|---|
| 575772 | 5/1959 | Canada ...................................... | 55/336 |
| 959667 | 4/1950 | France ....................................... | 55/330 |
| 1322718 | 7/1973 | United Kingdom ....................... | 55/487 |

*Primary Examiner*—David L. Lacey
*Attorney, Agent, or Firm*—Moss, Bensette, Thompson, Squires

[57] ABSTRACT

An air prefilter is disclosed for use with internal combustion engine air filters of the type having replaceable filter elements. The prefilter has a perforated sleeve connected between the usual intake openings and the filter element of the conventional air filter. This perforated sleeve is enveloped by an open-pore foam filter medium, which is of such porosity that engine intake air primarily passes therethrough rather than through the intake openings of the conventional air filter. The prefilter prevents foreign matter and water vapor from reaching and blocking the conventional filter element, which blocking causes the engine to receive insufficient air for efficient combustion. When the prefilter medium is saturated or blocked with impurities, the conventional air filter operates as usual, until the prefilter medium is cleaned or replaced. An adjustable deflector helps prevent foreign matter from blocking the prefilter medium. Annular plates retain the deflector in position and help prevent foreign matter from entering the conventional filter intake openings.

28 Claims, 4 Drawing Figures

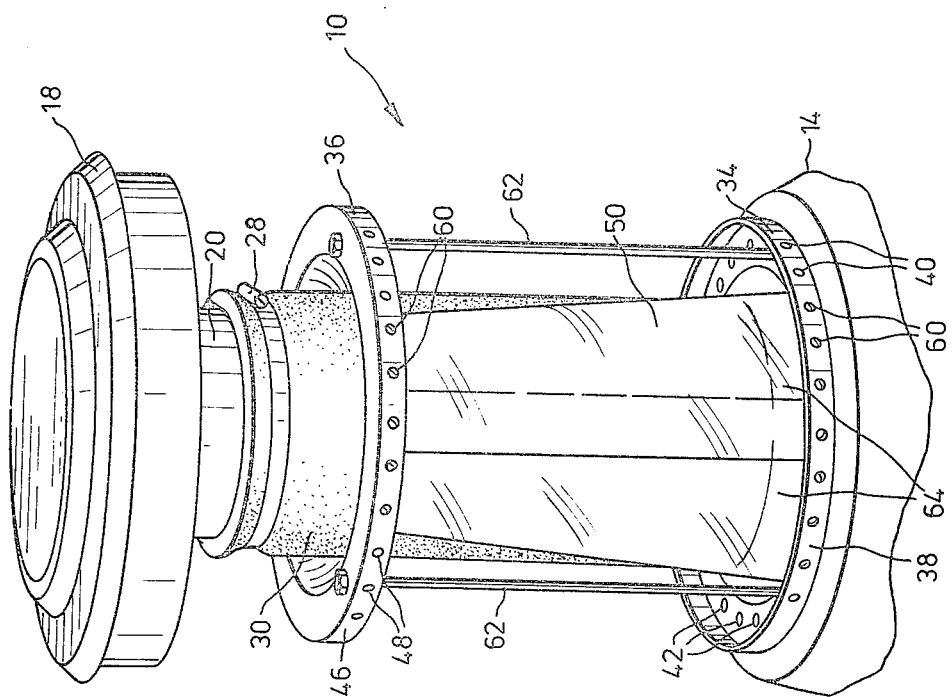
FIG. 3
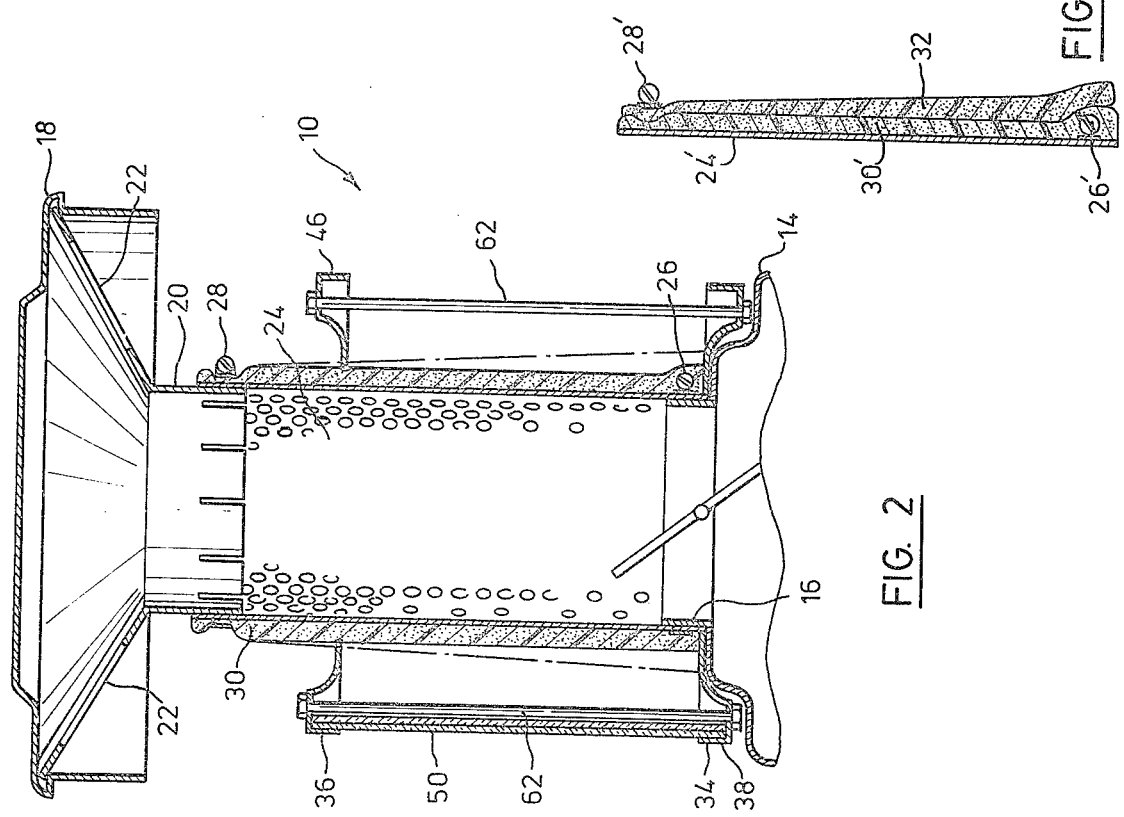
FIG. 4
FIG. 2

AIR PREFILTER

This invention relates to air filters for internal combustion engines.

As is well known, internal combustion engines require large quantities of air for combustion. The amount of air required, of course, depends upon many factors, such as the size of the engine, the speed at which the engine is operated, and ambient conditions such as temperature and pressure. Under all circumstances, sufficient air must be supplied to the engine or it does not operate efficiently. Of course, if the engine does not operate efficiently, fuel consumption is increased and energy is wasted.

It is also commonly recognized that the air supplied to the engine for combustion must be relatively clean or free from impurities such as dust, dirt particles, water or other foreign matter. Accordingly, it is necessary to provide engines with some type of air filter to prevent this foreign matter from entering the engine, and yet allow sufficient air to enter the engine for efficient operation.

Engine air filters are commonly made with a replaceable filter element fabricated from pleated paper material formed into an annular ring. A suitable housing has been used to direct air through the pleated paper filter element from the outside to the inside of the annular ring, or vice versa. Of course, the housing has one or more inlet or intake openings through which the air enters to pass through the paper filter element.

There are several difficulties with the engine air filters. The filter elements are relatively expensive, especially in larger sizes, such as are used with larger truck engines. Generally, the filter elements are intended to be discarded rather than cleaned when they become dirty or blocked. Re-usable or cleanable filter elements are available, but these tend to be undesirably large in size, or still more expensive than paper filters. Also, such air filters are very prone to water damage caused by moisture accumulation or by rain or snow directly contacting the filter elements. This moisture mixes with the dust or other impurities removed from the air by the filter element, and this mixture quickly blocks the filter element depriving the engine of combustion air. The problem is particularly acute in cold climates, where moisture collects in the filter element and freezes. Often, snow enters the air filter and completely plugs or blocks the filter element causing the engine to cease operating.

The present invention provides an economical air prefilter for use with a conventional engine air filter, the prefilter being inserted between the normal intake openings and the filter element of the conventional filter. The prefilter traps and removes moisture and impurities which otherwise would be collected in the conventional filter element, and thus the efficiency of the overall air filter is increased.

According to the present invention, there is provided a prefilter for use with an engine filter of the type having a filter housing containing a filter element, and an intake housing defining an air inlet opening. The prefilter comprises a perforated, generally rigid sleeve adapted to be connected between the filter housing and the intake housing, so that air may pass from the air inlet opening through the sleeve to the filter housing. A foraminous filter medium envelops the sleeve, the filter medium being of such porosity that engine intake air primarily passes therethrough. Also, means are provided for releasably coupling the sleeve to the filter housing and to the intake housing.

A preferred embodiment of the invention will now be described, by way of example, with reference to the accompanying drawings, in which:

FIG. 2 is a vertical sectional view of the prefilter shown in FIG. 1;

FIG. 3 is a front perspective view of the assembled prefilter and top portion of the air filter shown in FIG. 1; and FIG. 4 is a vertical sectional view of a portion of the sleeve and filter medium of another embodiment of a prefilter according to the present invention.

Figure 1:
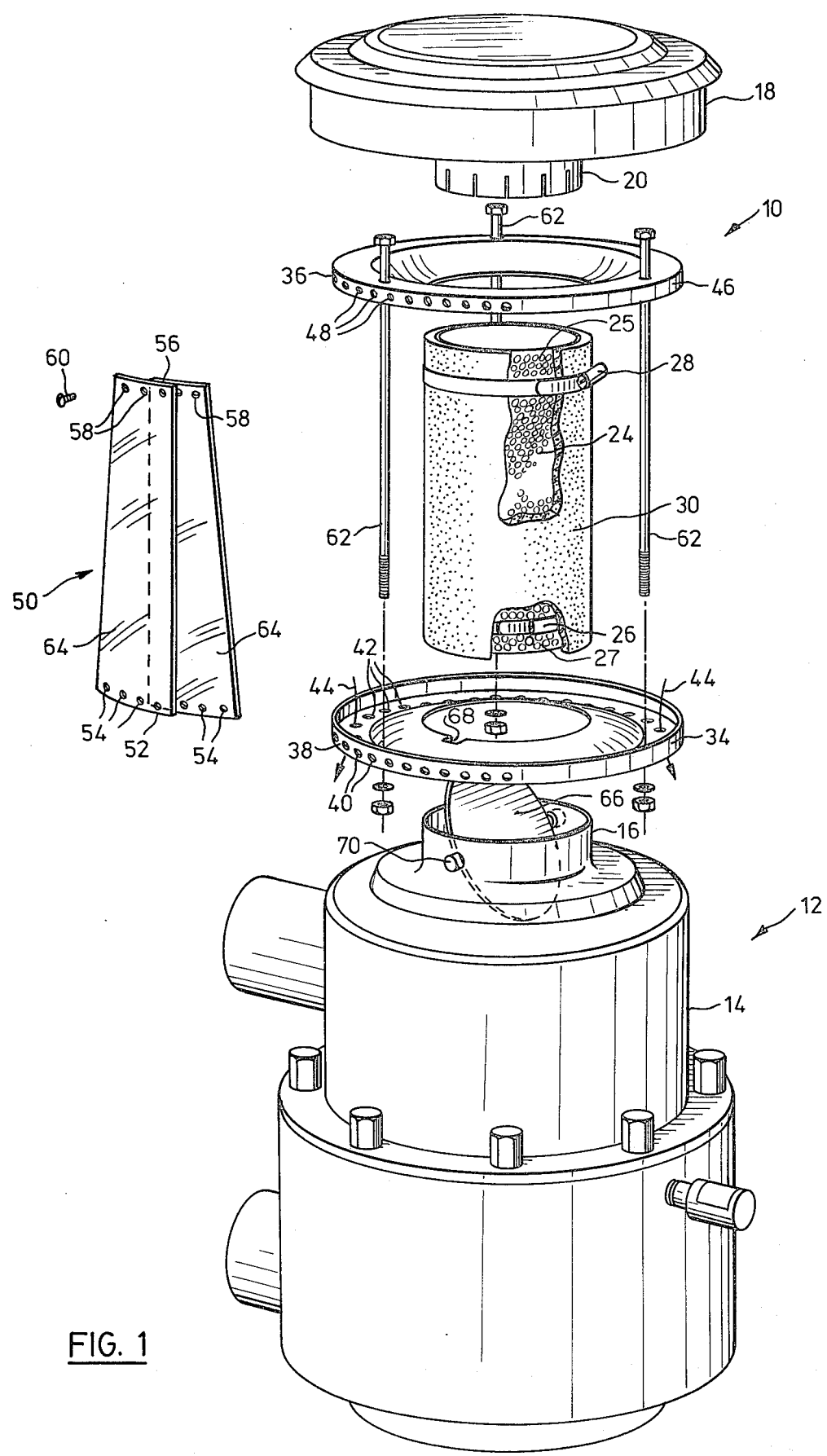
FIG. 1 is an elevational, exploded view, partly broken away, of an engine air filter incorporating a preferred embodiment of an air prefilter according to the present invention.

Referring to the drawings, a preferred embodiment of an engine air prefilter according to the present invention is generally indicated by reference numeral 10. Prefilter 10 is shown mounted on a conventional engine air filter 12, such as is typically used for filtering engine intake air for larger truck engines. The air filter 12 itself is not part of the present invention, and therefore, will not be described in detail. However, the basic features of an engine air filter will be described next below, to the extent that this is necessary for an understanding of the present disclosure.

A typical engine air filter 12 has a filter housing 14 which contains a filter element (not shown) for removing impurities from the air, such as dust, dirt particles, etc. Filter housing 14 has an air-inlet collar 16, and the internal structure of filter housing 14 is such that air entering inlet collar 16 is passed through the filter element, and then out of filter housing 14 to the engine. The remaining structure of filter housing 14 is not relevant to the present invention.

Air filter 12 also includes a raincap or intake housing 18, which has a central outlet flange 20. Intake housing 18 also defines inlet openings 22 (see FIG. 2) through which air enters intake housing 18 to pass downwardly through outlet flange 20 and on to filter housing 14. In a conventional air filter 12, intake housing 18 is mounted on top of filter housing 14, with outlet flange 20 engaging inlet collar 16. Air then enters the inlet openings 22 of raincap or intake housing 18 and passes directly into filter housing 14.

As seen in the drawings, air prefilter 10 is mounted between intake housing 18 and filter housing 14. Prefilter 10 includes a perforated, generally rigid sleeve 24 connected between outlet flange 20 of intake housing 18 and inlet collar 16 of filter housing 14. Sleeve 24 includes an inlet end portion 25 and an outlet end portion 27, is formed of metal screen material, and is of suitable thickness to withstand inward deflection caused by impinging wind or foreign particulate matter where air filter 12 is used on a moving vehicle. Sleeve 24 is retained in position by a lower clamp 26 (see FIG. 1), and by an upper clamp 28. Sleeve 24 may be formed with a longitudinal seam to facilitate the clamping of the sleeve onto inlet collar 16 and outlet flange 20.

A foraminous filter medium 30 envelops sleeve 24. Filter medium 30 is tubular in configuration and is formed of open-cell or open-pore polyurethane foam material. As such, filter medium 30 is washable, and therefore re-usable. Filter medium 30, as well as sleeve 24, may be decoupled or demounted from filter housing 14 and intake housing 18 by loosening clamps 26, 28 and longitudinally separating these components.

There are several preferred embodiments of filter medium 30. The simplest embodiment is a tubular sleeve having a wall thickness of approximately 5/8 inches, an inside diameter of approximately 6 inches, and a length of approximately 13 inches. The polyurethane foam used for filter medium 30 preferably has a pore size of approximately 20 to 30 pores per inch. In another embodiment, a second open-pore, polyurethane foam tubular sleeve filter medium envelops the inner filter medium 30. The outer filter medium has a porosity or pore size of approximately 20 pores per inch, and the inner filter medium 30 has a lower porosity or pore size of approximately 30 pores per inch. In yet another embodiment, filter medium 30 is in the configuration of a hollow frustum, the thickness thereof increasing toward a larger diameter base, as indicated in chain-dotted lines in FIG. 2. The larger diameter base of the frustum is adjacent to filter housing 14. Referring to FIG. 4, still another embodiment of a filter medium is shown, primed reference numerals being used to indicate elements similar to those of FIG. 1. In this embodiment, filter medium 30' is a first filter medium, and a second foraminous filter medium 32 envelops first filter medium 30'. Second filter medium 32 is in the configuration of a hollow frustum, again with the larger diameter thicker base of the frustum being adjacent to filter housing 14 (not shown). Second filter medium 32 is also formed of open-pore polyurethane foam, but it is of lower density or higher porosity than filter medium 30'. Second filter medium 32 has a pore size of approximately 20 pores per inch, whereas filter medium 30' has a pore size of approximately 30 pores per inch.

The purpose of the use of two layers of filter medium having different porosities is to increase filtering efficiency. The outer, more porous filter medium removes larger particles, while the inner, less porous medium removes the smaller particles without becoming blocked or plugged by larger particles. The purpose of using a conical or frustum shaped filter medium primarily is to facilitate the removal of moisture from the filter medium. Water collected in filter medium 30 runs downwardly toward the base of the filter medium. A thicker base permits more water to be removed by the filter medium, and the filter medium to operate more efficiently adjacent to filter housing 14. A thicker base also reduces the likelihood of water being sucked into the filter housing near inlet collar 16.

Air prefilter 10 also includes a first annular plate 34 located adjacent to filter housing 14, and a second annular plate 36 spaced above first plate 34. First annular plate 34 is located over sleeve 24 and has a peripheral edge portion 38 containing a plurality of circumferentially spaced-apart openings 40. First annular plate 34 also contains a plurality of bottom drain openings 42 spaced radially inwardly from peripheral edge portion 38. Water removed from the air by filter medium 30 runs downwardly onto first annular plate 34 and is drained away through drain openings 42 as indicated by arrows 44 in FIG. 1. First annular plate 34, as well as second annular plate 36, next described, help to prevent foreign matter from entering intake housing 18.

Second annular plate 36 is located over filter medium 30 and is spaced between intake housing 18 and first annular plate 34. Second annular plate 36 also includes a peripheral edge portion 46 which contains a plurality of circumferentially spaced-apart openings 48, the purpose of which is described next below.

Air prefilter 10 also includes an elongate deflector 50 spaced from and located parallel to filter medium 30. Deflector 50 has a base 52 attached to the peripheral edge portion 38 of first annular plate 34. For this purpose, deflector base 52 contains a plurality of openings 54 which are spaced apart to correspond with openings 40 in annular plate edge portion 38. Deflector 50 also has a top portion 56 containing openings 58 to correspond with openings 48 in the peripheral edge portion 46 of the upper second annular plate 36. Deflector 50 is attached to first and second annular plates 34, 36 by threaded fasteners 60. First and second annular plates 34, 36 are retained in position by long threaded fasteners 62 passing therethrough, although it will be appreciated that deflector 50 also helps to retain annular plates 34, 36 in position when the deflector is fastened thereto.

As seen best in FIGS. 1 and 3, deflector 50 includes a pair of downwardly widening tapered members 64 which overlap. The width of deflector 50 is thus adjustable by varying the amount of overlap when attaching tapered members 64 to first and second annular plates 34, 36.

To install air prefilter 10 on an air filter 12, intake housing 18 is first removed from filter housing 14. Prefilter 10 may be pre-assembled, or it may be assembled on filter housing 14, but in either case, the lower or first annular plate 34 is placed over inlet collar 16 and slid downwardly onto the top of filter housing 14. If the intake filter has a butterfly valve or damper 66 as shown in FIG. 1, first annular plate 34 may be formed with an inner notch 68 in order to clear the projecting cross-shaft 70 of butterfly valve 66. Only one inner notch 68 is necessary, because first annular plate 34 may be rotated 180° to permit annular plate 34 to slide below both ends of cross-shaft 70.

Where the prefilter 10 is pre-assembled, intake housing 18 is then mounted on prefilter 10 by sliding outlet flange 20 inside sleeve 24. Clamps 26, 28 are then tightened to complete the assembly. Where prefilter 10 is not pre-assembled, after first annular plate 34 is positioned, sleeve 24, with filter medium 30 and clamps 26, 28 loosely mounted thereon, is placed over inlet collar 16. Deflector tapered members 64 and second annular plate 36 are then positioned. Threaded fasteners 60 and 62 are then installed. As above, intake housing 18 is then assembled and clamps 26, 28 are tightened to hold the assembly together.

In operation, where air prefilter 10 is used in conjunction with an air filter 12 on a moving vehicle, such as a truck, deflector 50 is positioned so that it is facing forwardly or toward the front of the vehicle. Deflector 50 thus faces the oncoming wind and shields and protects filter medium 30 from flying foreign matter, which may block or damage the prefilter medium. Deflector 50 is retained in position due to friction between filter medium 30 and the peripheral edge of the central opening in second annular plate 36. In a typical air filter 12, it is believed that the suction is greatest adjacent to inlet collar 16, and that this suction decreases somewhat vertically along sleeve 24 toward intake housing 18. For this reason, deflector 50 is wider at the base, as is filter medium 30 or 32 where frustum shaped filter media are used.

Although several embodiments of filter medium are described above, in each case, the porosity of the filter medium is such that engine intake air primarily passes therethrough, rather than through inlet openings 22 of intake housing 18. The majority of the dust, dirt and moisture, therefore, is trapped by filter medium 30, rather than by the usual paper filter element located inside filter housing 14. When filter medium 30 becomes saturated or blocked with foreign matter, air once again enters air filter 12 through inlet openings 22 and the air filter operates in the normal fashion. However, at this point, filter medium 30 is removed, cleaned and replaced, allowing intake air once again to pass through the prefilter medium.

Having described preferred embodiments of the invention, it will be appreciated that various modifications may be made to the structures described. For example, the various male and female type connections between outlet flange 20, sleeve 24 and inlet collar 16 could be reversed. In other words, sleeve 24 could fit inside inlet collar 16 and outlet flange 20 could fit inside sleeve 24. Also, other means could be employed to connect or couple the assembly together, rather than using clamps 26, 28.

Other materials may be used for the filter medium than polyurethane foam. The filter medium could be disposable, rather than washable or cleanable. However, it is important that the filter medium be capable of removing water from the air, so the filter medium should be formed of material which is suitable for this purpose. Foam having a pore size of less than 20 to 30 pores per inch or more than 30 to 40 pores per inch can be used in areas where the dust, dirt and moisture conditions dictate such lower or higher porosities.

Sleeve 24 (and the corresponding filter medium 30) could be of a configuration other than tubular or cylindrical. Sleeve 24 could also be made from wire mesh or expanded metal.

It will be appreciated that air prefilter 10 is readily adaptable for use in applications other than automotive intake-air filtering. For example, the prefilter may be used on stationary engines, deflector 50 could be eliminated, or other shielding means may be employed. Annular plates 34, 36 could also be deleted in this case. Further, deflector 50 does not need to be adjustable in width, or it could be adjustable in length. Adjustability permits the deflector to be varied in size to suit the average conditions under which the prefilter is used.

It will be appreciated from the above, that the air prefilter of this invention increases the efficiency and life of the conventional air filter medium or element used in the engine air filter. The prefilter removes the most harmful foreign matter from the air, such as larger dirt particles and moisture. When the prefilter medium becomes saturated, the remainder of the air filter operates as usual, until the prefilter medium can be washed or replaced. Accordingly, the use of the air prefilter of the present invention results in increased engine efficiency, especially where moisture or precipitation has a deleterious effect on conventional air filters.

What I claim as my invention is:

1. A prefilter for use with an engine air filter of the type having a filter housing containing a filter element, and an intake housing having an air inlet opening, the prefilter comprising: a perforated, generally rigid sleeve having opposite air inlet and air outlet end portions, the sleeve inlet and outlet end portions being adapted to be connected respectively to said intake housing and said filter housing, so that air may pass from said air inlet opening axially through the sleeve to said filter housing, and air may also pass transversely through the sleeve to said filter housing; a foraminous filter medium enveloping the sleeve, the filter medium being in the configuration of a hollow frustum having a thicker, larger diameter base located adjacent to the sleeve outlet end portion and of such porosity that engine intake air primarily passes therethrough and thus transversely through the sleeve to said filter housing; and means for releasably coupling the sleeve end portions of the filter housing and to the intake housing.

2. A prefilter as claimed in claim 1 and, further comprising another foraminous filter medium located between said sleeve and said filter medium, said filter medium being of higher porosity than said other filter medium.

3. A prefilter as claimed in claim 2 and further comprising an elongated deflector spaced from and located parallel to the filter medium, the deflector having a base located adjacent to the sleeve outlet end portion; and means for retaining the deflector in position.

4. A prefilter as claimed in claim 1 and further comprising an elongated deflector spaced from and located parallel to the filter medium, the deflector having a base located adjacent to the sleeve outlet end portion; and means for retaining the deflector in position.

5. A prefilter as claimed in claim 4 wherein the deflector is tapered, the width of the deflector increasing toward the sleeve outlet end portion.

6. A prefilter as claimed in claim 4 wherein the deflector comprises a pair of overlapping members, and further comprising means for varying the amount of overlap thereby making the width of the deflector adjustable.

7. A prefilter as claimed in claim 4 wherein the retaining means for retaining the deflector in position includes an annular plate located over the sleeve adjacent to the sleeve outlet end portion, said plate having a peripheral edge portion connected to the deflector base.

8. A prefilter as claimed in claim 7 wherein the annular plate contains a plurality of bottom drain openings spaced radially inwardly from said peripheral edge portion.

9. A prefilter as claimed in claim 6 wherein said annular plate is a first annular plate, and wherein the retaining means for retaining the deflector in position includes a second annular plate located over the filter medium, the second annular plate being spaced between the sleeve inlet end portion and the first annular plate, and the second annular plate including a peripheral edge portion connected to the deflector.

10. A prefilter as claimed in claim 1 or 4 wherein the filter medium has a maximum pore size of between 20 and 30 pores per inch.

11. A prefilter for use with an engine air filter of the type having a filter housing containing a filter element, and an intake housing having an air inlet opening, the prefilter comprising: a perforated, generally rigid sleeve having opposite air inlet and air outlet end portions, the sleeve inlet and outlet end portions being adapted to be connected respectively to said intake housing and said filter housing, so that air may pass from said air inlet opening axially through the sleeve to said filter housing, and air may also pass transversely through the sleeve to said filter housing; a foraminous filter medium enveloping the sleeve, the filter medium being of such porosity that engine intake air primarily passes therethrough and thus transversely through the sleeve to said filter housing; means for releasably coupling the sleeve end portions to the filter housing and to the intake housing an elongate deflector spaced from and located parallel, to the filter medium, the deflector having a base located adjacent to the sleeve outlet end portion, the deflector being tapered, the width of the deflector increasing toward the sleeve outlet end portion, and means for retaining the deflector in position.

12. A prefilter as claimed in claim 11 wherein said filter medium comprises a first filter medium, and further comprising a second foraminous filter medium enveloping said first filter medium, said second filter medium being of higher porosity than said first filter medium.

13. A prefilter for use with an engine air filter of the type having a filter housing containing a filter element, and an intake housing having an air inlet opening, the prefilter comprising: a perforated, generally rigid sleeve having opposite air inlet and air outlet end portions, the sleeve inlet and outlet end portions being adapted to be connected respectively to said intake housing and said filter housing, so that air may pass from said air inlet opening axially through the sleeve to said filter housing, and air may also pass transversely through the sleeve to said filter housing; a foraminous filter medium enveloping the sleeve, the filter medium being of such porosity that engine intake air primarily passes therethrough and thus transversely through the sleeve to said filter housing; means for releasably coupling the sleeve end portions to the filter housing and to the intake housing; an elongate deflector spaced from and located parallel to the filter medium, the deflector having a base located adjacent to the sleeve outlet end portion, the deflector also having a pair of overlapping members, and means for varying the amount of overlap making the width of the deflector adjustable; and means for retaining the deflector in position.

14. A prefilter as claimed in claim 13 wherein said filter medium comprises a first filter medium, and further comprising a second foraminous filter medium enveloping said first filter medium, said second filter medium being of higher porosity than said first filter medium.

15. A prefilter as claimed in claim 13 wherein the deflector is tapered, the width of the deflector increasing toward the sleeve outlet end portion.

16. A prefilter for use with an engine air filter of the type having a filter housing containing a filter element, and an intake housing having an air intake opening, the prefilter comprising: a perforated, generally rigid sleeve having opposite air inlet and air outlet end portions, the sleeve inlet and outlet end portions being adapted to be connected respectively to said intake housing and said filter housing, so that air may pass from said air inlet opening axially through the sleeve to said filter housing, and air may also pass transversely through the sleeve to said filter housing; a foraminous filter medium enveloping the sleeve, the filter medium being of such porosity that engine intake air primarily passes therethrough and thus transversely through the sleeve to said filter housing; means for releasably coupling the sleeve end portions to the filter housing and to the intake housing; an elongate deflector spaced from and located parallel to the filter medium, the deflector having a base located adjacent to the sleeve outlet end portion; an annular plate located over the sleeve adjacent to the sleeve outlet end portion for retaining the deflector in position, said plate having a peripheral edge portion connected to the deflector base.

17. A prefilter as claimed in claim 16 wherein said filter medium comprises a first filter medium, and further comprising a second foraminous filter medium enveloping said first filter medium, said second filter medium being of higher porosity than said first filter medium.

18. A prefilter as claimed in claim 17 wherein the annular plate contains a plurality of bottom drain openings spaced radially inwardly from said peripheral edge portion.

19. A prefilter as claimed in claim 17 wherein said annular plate is a first annular plate, and further comprising a second annular plate located over the filter medium, the second annular plate being spaced between the sleeve inlet end portion and the first annular plate, and the second annular plate including a peripheral edge portion connected to the deflector.

20. A prefilter as claimed in claim 16 wherein the annular plate contains a plurality of bottom drain openings spaced radially inwardly from said peripheral edge portion.

21. A prefilter as claimed in claim 16 wherein said annular plate is a first annular plate, and further comprising a second annular plate located over the filter medium, the second annular plate being spaced between the sleeve inlet end portion and the first annular plate, and the second annular plate including a peripheral edge portion connected to the deflector.

22. In an engine air filter system having a filter housing containing a filter element and an intake housing having an air inlet opening and an improved prefilter wherein the improved prefilter comprises: a perforated, generally rigid sleeve spaced between said intake and filter housings, the sleeve including opposite air inlet and air outlet end portions having respective axial air inlet and air outlet openings, said inlet and outlet end portions being connected respectively to said intake housing and said filter housing, so that ambient air may pass transversely through the sleeve to said filter housing and alternatively from said air inlet opening axially through the sleeve to said filter housing; a foraminous filter medium enveloping the sleeve and exposed to ambient air, the filter medium being of such porosity that engine intake air primarily passes transversely therethrough and thus transversely through the sleeve to said filter housing; and means for releasably coupling the sleeve end portions to the filter housing and to the intake housing.

23. Apparatus as claimed in claim 22 wherein the filter medium is in the configuration of a hollow frustum having a thicker, larger diameter base located adjacent to the sleeve outlet end portion.

24. Apparatus as claimed in claim 22 wherein said filter medium comprises first filter medium, and further comprising a second foraminous filter medium enveloping said first filter medium, said second filter medium being of higher porosity than said first filter medium.

25. Apparatus as claimed in claim 24 wherein the second filter medium is in the configuration of a hollow frustum having a thicker, larger diameter base located adjacent to the sleeve outlet end portion.

26. Apparatus as claimed in claim 24 and further comprising an elongated deflector spaced from and located parallel to the filter medium, the deflector having a base located adjacent to the sleeve outlet end portion; and means for retaining the deflector in position.

27. Apparatus as claimed in claim 22 and further comprising an elongated deflector spaced from and located parallel to the filter medium, the deflector having a base located adjacent to the sleeve outlet end portion; and means for retaining the deflector in position.

28. Apparatus as claimed in claim 22 wherein the filter medium has a maximum pore size of between 20 and 30 pores per inch.

* * * * *